Jan. 2, 1968   B. J. REINERTSEN   3,361,573
METHOD OF MAKING A CHIP TYPE FOOD PRODUCT
Filed July 13, 1964
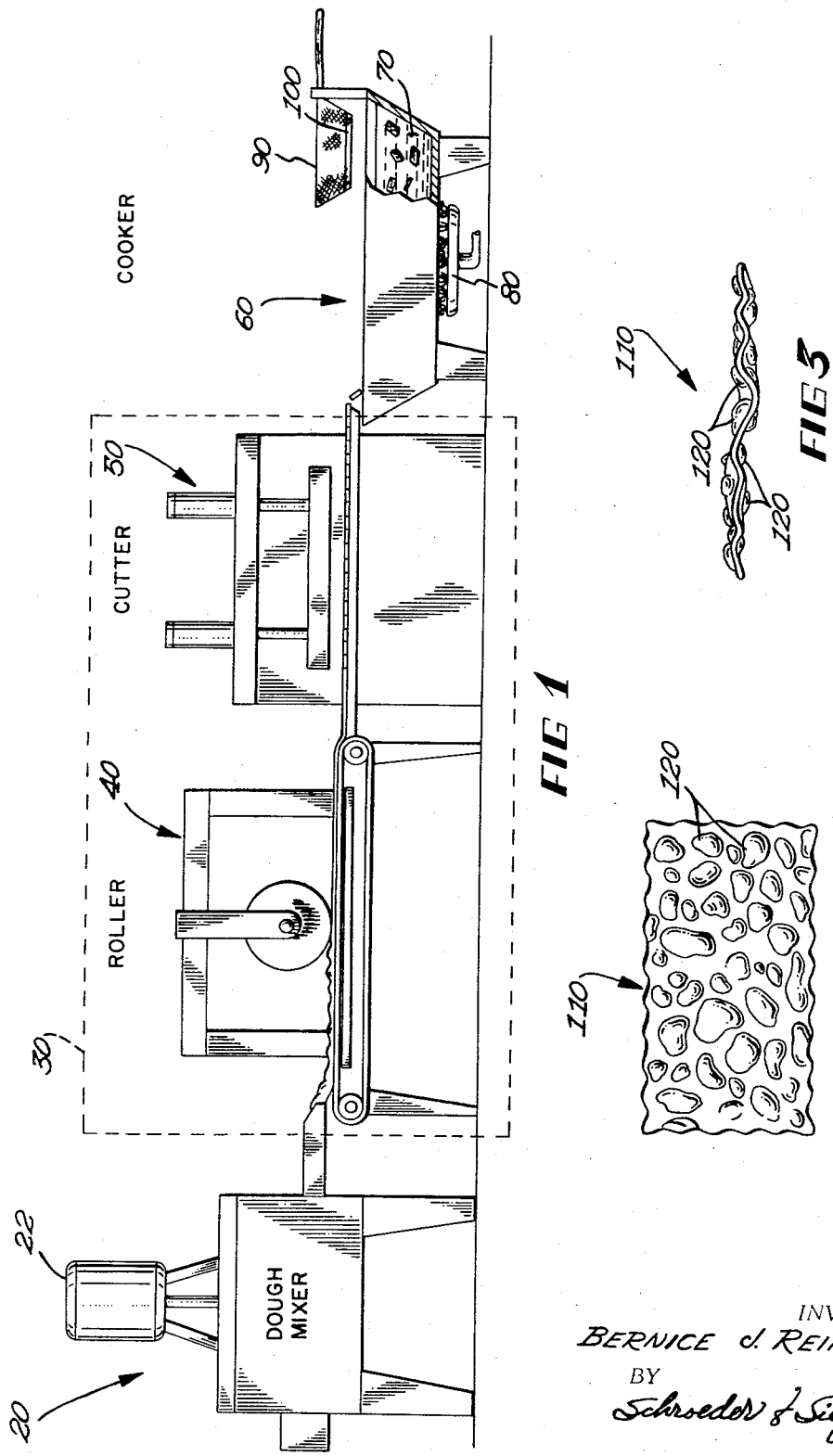
INVENTOR.
BERNICE J. REINERTSEN
BY
Schroeder & Siegfried
ATTORNEYS

United States Patent Office 3,361,573
Patented Jan. 2, 1968

3,361,573
METHOD OF MAKING A CHIP TYPE
FOOD PRODUCT
Bernice J. Reinertsen, Granada, Minn. 56039
Filed July 13, 1964, Ser. No. 382,242
7 Claims. (Cl. 99—83)

ABSTRACT OF THE DISCLOSURE

This disclosure relates to an improved method for making a chip type food product wherein dry ingredients comprising a dried potato product, flour and dry flavoring ingredients are mixed with water to form a dough, an activated leavening agent added thereto, followed by chilling, shaping and cooking said product.

The present invention relates generally to comestibles and more particularly to an improved method of making a chip type food product and the food product resulting from the method.

Comestibles, such as the potato chip, have been gaining increasing popularity. However, the basic potato chip presents no variation in appearance or flavor. Similarly, the synthetic potato chip results in the same food product with generally the same limitations on physical characteristics and flavoring. An increased popularity in the chip type product has resulted in a variety new foods which have similar appearances and characteristics to the potato chip and which have varying flavorings added thereto to increase the attractiveness of the food product. The present invention is directed to an improved method of making a chip type food product which retains the same general characteristics of the chip, but has included therewith a bubbled surface to increase the attractiveness of the product while still retaining the rigidity of the chip for ease in serving and eating. Further, the new improved chip type food product permits the introduction of various vegetable flavorings in natural form to increase the attractiveness and flavoring of the food product.

It is therefore the principal object of the present invention to provide an improved comestible.

Another object of this invention is to provide an improved chip type food product which may incorporate natural flavorings such as cheeses and dried chopped vegetables.

A further object of this invention is to provide an improved method of making a chip type food product.

It is also an object of this invention to provide an improved chip type food product utilizing a leavening agent in which the action of the leavening agent is substantially reduced to provide only slight bubbling over the surface of the chip product.

These and other objects of this invention will become apparent from a reading of the attached description together with the drawings wherein:

FIGURE 1 is a schematic diagram of the apparatus and process of making the improved chip type food product, FIGURE 2 is a plan view of the improved chip type food product made from the improved process, and FIGURE 3 is a side elevation view of the improved chip type food product of FIGURE 2.

The improved food product or comestible and the method for making the same utilizes basically manufactured or processed natural ingredients which are commercially available as distinguished from the raw vegetable and/or any chemical compounds used in synthetic products. In the improved process, a dough is made from substantially equal parts of a dried potato product, flour, and water with certain inert dry flavoring ingredients such as salt with ground vegetable and a dried inactive yeast. The yeast is added in such a manner to activate the yeast so that the resulting product is chip type in form with sufficient strength or rigidity to be suitable for ease in serving and eating. The dough so formed is maintained in a chilled condition as it is rolled to a chip thickness of approximately 1/32 inch or from .03–.1 of an inch in thickness and is cut into varying forms, such as a rectangle. The dough shapes so formed and maintained in the chilled condition of approximately 40–60 degrees Fahrenheit will show no evidence of action of the leavening agent, which action is substantially impeded by the cooling of the dough. The dough shapes are cooked by a deep-frying process for a relatively short period during which the leavening agent acts to provide a bubbled surface on the chip without destroying the rigidity or strength of the same so that it is suitable for use as a chip with sufficient strength such as not to crumble or crack when utilized with other foods. Further the chips retain their crispness for a substantially long period. The cooking time in the deep-frying process is from 10–30 seconds in which time the chips will be turned and removed from the oil, which is preferably a peanut oil maintained at a temperature between 300 and 325 degrees Fahrenheit.

Thus, as shown in the drawing, the ingredients forming the dough, which are comprised basically of equal parts of a dried potato product, flour, and water with a 1–6% flavoring in the form of salt with chopped vegetable therein and a liquid flavoring of acetic acid, a vegetable and salt, are mixed together with a dough mixer, such as indicated at 20, having a power means 22 driving the same. The dough has added thereto from 1–2% of dried yeast by total volume which dried yeast is activated with tempered water. The yeast is introduced into the dough after the dried ingredients have been mixed with the water at a boiling temperature to form a dough. The dough is discharged into a chamber having refrigeration associated therewith to maintain the temperature of the chamber, indicated at 30 and the dough introduced therein, between a level from 40–60 degrees Fahrenheit. The dough so discharged from the mixer is rolled into thin sheets or thicknesses varying from .03–.1 of an inch or approximately 1/32 inch in thickness. The rolling mechanism, indicated at 40, discharges the dough into a slicing or cutting machine, indicated generally at 50, which machine cuts the dough into predetermined shapes, such as a rectangular form, and discharges the same into a cooking vat or cooking apparatus, indicated at 60. The cooking process is a deep-frying process and the oil or cooking medium, indicated generally at 70, is maintained at a temperature level from 300–350 degrees Fahrenheit through control of a heating mechanism such as the burner 80 associated therewith. The cooking process of the chip so discharged from the cutting machine into the cooker 60 takes from 10–30 seconds during which time the chips are rotated and removed onto a drying sheet, indicated at 90, having suitable means such as an oil absorbing medium 100 associated therewith to remove the excess oil from the chips. One dough form or shape is shown in FIGURE 2 as a chip at 110, the chip having bubbled surfaces 120 thereon covering from 10–25% of the surfaces of the chip. Chip 110 is shown in the side elevation view in FIGURE 3. It takes on a generally rippled surface while maintaining rigidity so that it may be used and served without crumbling and is similar to the conventional potato chip in physical characteristics and for eating. This bubble surface increases the attractiveness of the food product, adds to the lightness of the same but does not destroy the chip type characteristics which makes it desirable for eating, serving, and use with other foods, such as dips.

The chip type food product may also include as additional flavoring, such as a natural flavoring through the addition from 1–2% chopped vegetables, such as chives and the like. The following example is given by way of illustrating the present invention:

*Example*

The following ingredients are intimately admixed to form the dough in the percentages set forth:

| | Percent by volume |
|---|---|
| Pre-cooked instant dried potatoes (dry basis) | 32 |
| Wheat flour (dry basis) | 32 |
| Inert dry ingredients: | |
|    Salt (sodium chloride) | 1 |
|    Salt with dried chopped onion | 1 |
|    Salt with dried chopped garlic | ⅓ |
|    Accent (monosodium glutamate) | ⅓ |
| Tabasco sauce (acetic acid, sodium chloride, red chopped pepper) | ½ |
| Dry yeast (inactive) | 1⅓ |

These materials are commercially available in manufactured or processed form, such that the food product may be made in all types of production or manufacture. The dried yeast is activated through the use of a small amount of water and is added to the dough which is formed from an approximately equal volume of water flour and potato flakes, or approximately 32% of the total volume. The major portion of the water used is added to the dry ingredients at boiling temperature to form the dough. The yeast mixture is mixed into the dough and the temperature level of the dough is reduced to between 40 and 60 degrees Fahrenheit to cool the dough. Thereafter the dough is rolled to a thickness of approximately .03–.1 of an inch or in the range of ½₂ of an inch while maintaining the dough in the cooled temperature level. The rolled dough should be of uniform thickness to fry evenly and the cooking process is a deep-frying process. The rolled dough is cut into desired dough shapes while still cool and the dough shapes are thereafter cooked at a temperature level between 300 and 325 degrees Fahrenheit for approximately 30 seconds. I have found a suitable non-aqueous medium in the form of hot peanut oil. During the cooking process, the chips are agitated or turned to fry evenly and are removed and dried to remove the excess oil.

As a variation of the example above, the inert dry ingredients may include an addition up to 2% by volume of graded American Cheese, celery salt, or chopped vegetable, such as chives. The resulting food product provides the desired rigidity for use as a chip in eating and serving with other foods, is attractive and interesting as well as being flavorful.

While I have described above a preferred embodiment of the present invention, it will be recognized that various modifications may be made thereto without departing from the scope of the present invention. Therefore, I wish to be limited only by the appended claims.

What is claimed is:
1. The method of producing a chip type food product comprising: mixing dry ingredients of approximately 40–45 percent of a dry potato product, 40–45 percent of flour and inert dry flavoring ingredients in an amount sufficient to make up 100 percent dry volume; mixing said dry ingredients with a sufficient amount of water to make a dough; adding 1–2 percent of the dry volume of an activated leavening agent to the dough; cooling the dough to substantially reduce the action of the leavening agent; forming the dough into chip type dough shapes of approximately .03–.10 inch thickness while maintaining the dough shapes in a cooled condition; and thereafter cooking the dough shapes at a temperature above 300 degrees Fahrenheit for a period of time not to exceed 60 seconds.

2. The method of producing a chip type food product of claim No. 1 in which the water is heated to a boiling temperature before mixing it with the dry ingredients to form the dough.

3. The method of producing a chip type food product of claim No. 2 in which the leavening agent is a dry yeast which is activated by a small amount of temperature water before it is added to the dough.

4. The method of producing a chip type food product of claim No. 3 in which the cooking of the dough shapes is done by a deep frying process.

5. The method of producing a chip type food product of claim No. 4 and including a step of mixing a dried milk product in the amount of about 2 percent of the total volume of the dried ingredients with the dry ingredients prior to mixing with water to form the dough.

6. The method of producing a chip type food product of claim No. 4 and including a step of mixing a dried chopped flavoring vegetable in the amount of about 1 percent of the total volume of the dried ingredients prior to the mixing with water to form the dough.

7. The method of producing a chip type food product of claim No. 4 and including a final step of drying the cooked chips in a medium to reduce the oil content thereof.

References Cited

UNITED STATES PATENTS

| | | | |
|---|---|---|---|
| 3,027,258 | 3/1962 | Markakis et al. | 99—80 X |
| 3,076,711 | 2/1963 | Gerkens | 99—80 X |
| 3,174,864 | 3/1965 | Schiebel | 99—81 X |
| 3,190,755 | 6/1965 | Peden | 99—81 |
| 3,259,503 | 7/1965 | Tan et al. | 99—81 X |
| 3,282,701 | 11/1966 | Wong et al. | 99—81 X |

RAYMOND N. JONES, *Primary Examiner.*